July 9, 1963  L. J. DAVID  3,096,986
LUBRICATING DEVICE
Filed May 20, 1959
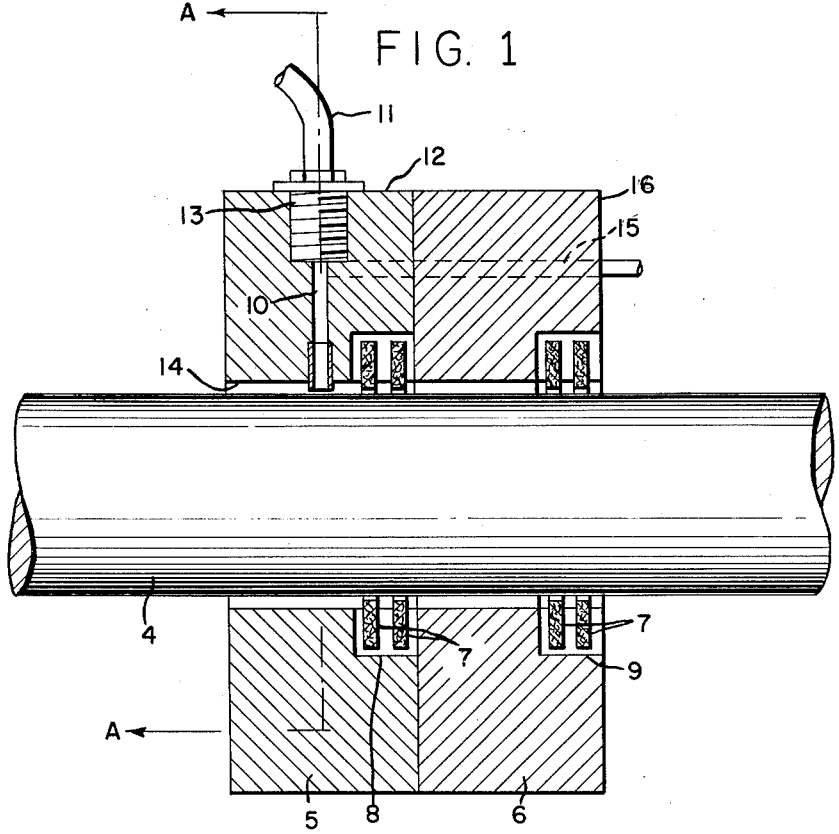
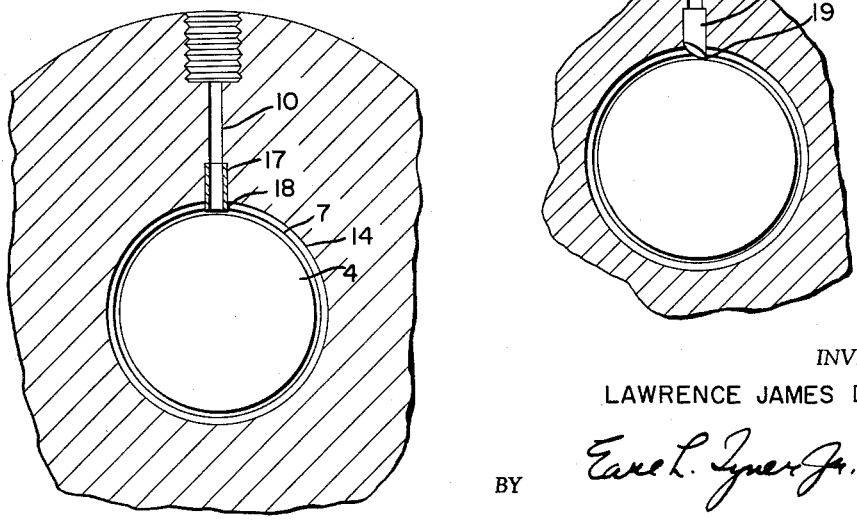
INVENTOR
LAWRENCE JAMES DAVID
BY
ATTORNEY

United States Patent Office 3,096,986
Patented July 9, 1963

3,096,986
LUBRICATING DEVICE
Lawrence James David, Brevard, N.C., assignor to E. I. du Pont de Nemours and Company, Wilmington, Del., a corporation of Delaware
Filed May 20, 1959, Ser. No. 814,575
5 Claims. (Cl. 277—32)

This invention relates to a device for lubricating a moving shaft, and more particularly to a novel combination oiler ring and packing retainer for a reciprocating shaft which avoids capillary wetting of the ring.

Various designs of oiler rings and packing retainers have been devised for the lubrication and sealing of the shafts of high pressure, reciprocating compressors. Among the most successful designs is a combination oiler ring and packing retainer. This combination ring and retainer provides a plurality of passageways communicating with the inside surface of the ring adjacent to the shaft at different locations on that surface, and a circular recessed portion in the ring to retain one or more packing rings, for example, a France-type packing ring. In the operation of this device, a lubricant is forced into the passageways in the ring and thence to the inside surface of the ring adjacent to the shaft. In most cases, the lubricant passes onto the shaft and is evenly distributed by the movement of the shaft. In the case of a substantially horizontal reciprocating shaft, this oiler ring affords very poor distribution of the lubricant near the upper portion of the shaft by virtue of the capillary wetting of the inside surface of the ring. This causes the lubricant to flow on the surface of the ring, and thus deprives the shaft of a major portion of oil supplied at the upper side. The absence of oil during the operation of the compressor results in abrasion of the shaft and damage to the packing in the area deprived of lubricant. This damage to the seals around the shaft allows the material being compressed to leak through the seal, and in the case of the compression of explosive gas, such as hydrogen, presents a hazardous situation when the gas mixes with the air in the semi-enclosed areas of the compressors forming an explosive mixture.

It is an object of this invention to provide an oiler ring which distributes the oil evenly over all portions of the shaft. Another object of this invention is to provide a combination oiler ring and packing retainer, having a plurality of inserts projecting from the inside surface of the ring adjacent to the shaft at the point of communication of the passageways with the inside surface of the shaft. These projections direct the lubricant away from the inside surface walls of the ring and onto the surface of the shaft.

The above objects are accomplished by providing a device for supplying a lubricating fluid to a moving shaft which has an inside surface adjacent to, and surrounding the shaft, a passageway connecting at least one point on the inside surface of the device with a source of a lubricant and a tube composed of a material softer than the material forming the shaft which is imbedded in the device at at least one point of communication of the passageway with the inside surface of the device. This tube projects from the inside surface of the ring towards the shaft, and prevents the lubricant from adhering to the inside surface of the device by directing the fluid onto the shaft. In the case where the shaft of the compressor is constructed of steel, a suitable material of construction for the tube is copper metal.

A more complete understanding of this invention may be had by referring to the drawing attached hereto and made a part of this specification.

FIGURE 1 is a cut-away view of the oiler ring and packing retainer of this invention.

FIGURE 2 is a front view of the cross-section of the oiler ring and packing retainer along the line A—A shown in FIGURE 1.

FIGURE 3 shows a modification of the insert tube shown in FIGURES 1 and 2 in the same cross-sectional view as in FIGURE 2.

With reference now to FIGURE 1, the shaft 4 is surrounded by the oiler ring and packing retainer 5, and an additional packing retainer 6 is shown adjacent to the oiler ring 5. For purposes of illustration, the packing 7 is shown in these figures as a common France-type ring, and is housed in the recessed portion 8 of the oiler ring and packing retainer 5, and the recessed portion 9 of the packing retainer 6. Additional retainers, such as the one depicated as 6 above, may be added to form a battery of packing rings if desired. In this illustrative embodiment, the lubricant is supplied to the passageway 10 through a suitable tube 11 attached to the outer portion 12 of the passageway 10 by a threaded connecting insert 13. In the majority of the applications of the device of this invention, a plurality of passageways, such as that shown at 10 in FIGURE 1, may be employed to achieve uniform distribution of the oil around the circumference of the shaft 4. The arrangement as shown may be duplicated at various intervals around the shaft to achieve a plurality of oiling points. Another method of achieving multiple oiling points is to form the passageway 10 within the body of the ring with a plurality of communicating passages from the main passage to the inside surface 14 of the ring 5 with only one common exterior source of lubricant feeding the main passage through an external tube and connection as shown in FIGURE 1 for a single lubricant passageway. The tube 11 need not be attached to the outer portion 12 of the oiler ring 5, but may be attached to another ring with a suitable communicating passageway through that ring to the oiler ring 5. Such an arrangement is shown in dotted lines at 15 of FIGURE 1. In this modification, the insert 13 and the tube 11 would be located at a suitable tap at the face 16 of the retaining ring 6. One skilled in the art may determine other suitable locations for the tap with the corresponding passageways communicating with the distribution system in the oiler ring.

At the point of communication of the passageway 10 with the inside surface 14 of the ring 5, is placed an insert tube 17 which is imbedded in the ring 5 and projects from the inside surface 14 of the ring towards the shaft 4. The material of construction of the insert tube 17 is softer than that of the shaft to prevent abrasion of the shaft by the insert. In the usual case, the shaft is fabricated of steel and a suitable material of construction for the insert 17 are metals and alloys of copper, zinc, bronze, lead and abrasion-resistant plastics, such as polytetrafluoroethylene.

A cross-section of the oiler ring along the lines A—A of FIGURE 1 is shown in FIGURE 2. The clearance between the shaft 4 and oiler ring 5 is about 1/16 inch for shaft diameters around 9¼ inches. The insert 17 projects beyond the inside surface 14 of the ring 5 and extends to a point in close proximity to the shaft 4, having a clearance less than the clearance mentioned above between the oiler ring and the shaft. The insert 17 may be maintained in contact with the shaft in applications where it is desired to eliminate the formation of drops on the tip of the insert.

Another design of a suitable insert is shown in FIGURE 3. The portion of the insert 18 projecting from the inside surface 14 of the oiler ring 5 is cut to form a pen-like extension 19. This design is particularly advantageous when the insert is held in contact with the shaft, since a minimum of tube area is available to touch the shaft, and thus abrade the shaft during operation.

Normally, the lubricating fluid is fed very slowly to the ring through the passageway, and thence to the inside surface of the ring. Prior to the instant invention, lubricating fluid followed the inside surface 14 of the ring 5 by virtue of the capillary action thereof, and deprived the upper or vertical portion of the shaft of lubricant. With the insert, as shown herein, projecting from the inside surface of the ring, the oil can no longer follow this surface, and is forced to either drop or bleed upon the shaft depending upon the proximity of the insert to the shaft. In both cases, the oil was effectively placed on the shaft, eliminating the above-described difficulties. In actual practice, the device of this invention has virtually eliminated excessive wear on the shaft and seals of reciprocating compressors, thus extending the useful life of the seals several fold, and eliminating the hazardous conditions associated with leakage as set forth above.

I claim:

1. A device for supplying a lubricating fluid to a reciprocating shaft having an inside surface adjacent to and surrounding said shaft, a passageway connecting said inside surface to a source of a lubricating fluid, and a tube composed of a material softer than the material forming said shaft attached at the end of said passageway adjacent said inside surface and extending said passageway by projecting from said inside surface towards said shaft.

2. A combination oiler ring and packing retainer for supplying a lubricating fluid to a reciprocating shaft and providing a housing for suitable packing, having an inside surface adjacent to and surrounding said shaft, a passageway connecting at least one point on said inside surface to a source of a lubricating fluid, a tube composed of a material softer than the material forming said shaft attached at the end of said passageway adjacent said inside surface and extending said passageway by projecting from said inside surface towards said shaft, and a circular recessed portion of substantially the same cross-sectional configuration across the said inside surface disposed along the axial center line of said ring away from the point of connection of said passageway with said inside surface for the retention of said packing.

3. A combination oiler ring and packing retainer device for supplying a lubricating fluid to a horizontally positioned, reciprocating shaft and providing a housing for suitable packing, having an inside surface adjacent to and surrounding said shaft, a passageway connecting at least one point on said inside surface to a source of a lubricating fluid, a tube composed of a material softer than the material forming said shaft imbedded in said device at at least one point of communication of said passageway with said inside surface and projecting from said inside surface towards said shaft, and a circular recessed portion of substantially the same cross-sectional configuration across the said inside surface disposed along the axial center line of said ring away from the point of connection of said passageway with said inside surface for the retention of said packing.

4. The ring of claim 3 in which said tube touches said shaft.

5. The ring of claim 3 in which said tube is constructed of copper metal and said shaft is constructed of steel.

References Cited in the file of this patent

UNITED STATES PATENTS

| | | |
|---|---|---|
| 779,480 | Johnston | Jan. 10, 1905 |
| 1,317,294 | Hildebrand | Sept. 30, 1919 |
| 1,643,971 | Wishart | Oct. 4, 1927 |
| 2,867,481 | Hornbostel | Jan. 6, 1959 |